United States Patent Office 2,920,675
Patented Jan. 12, 1960

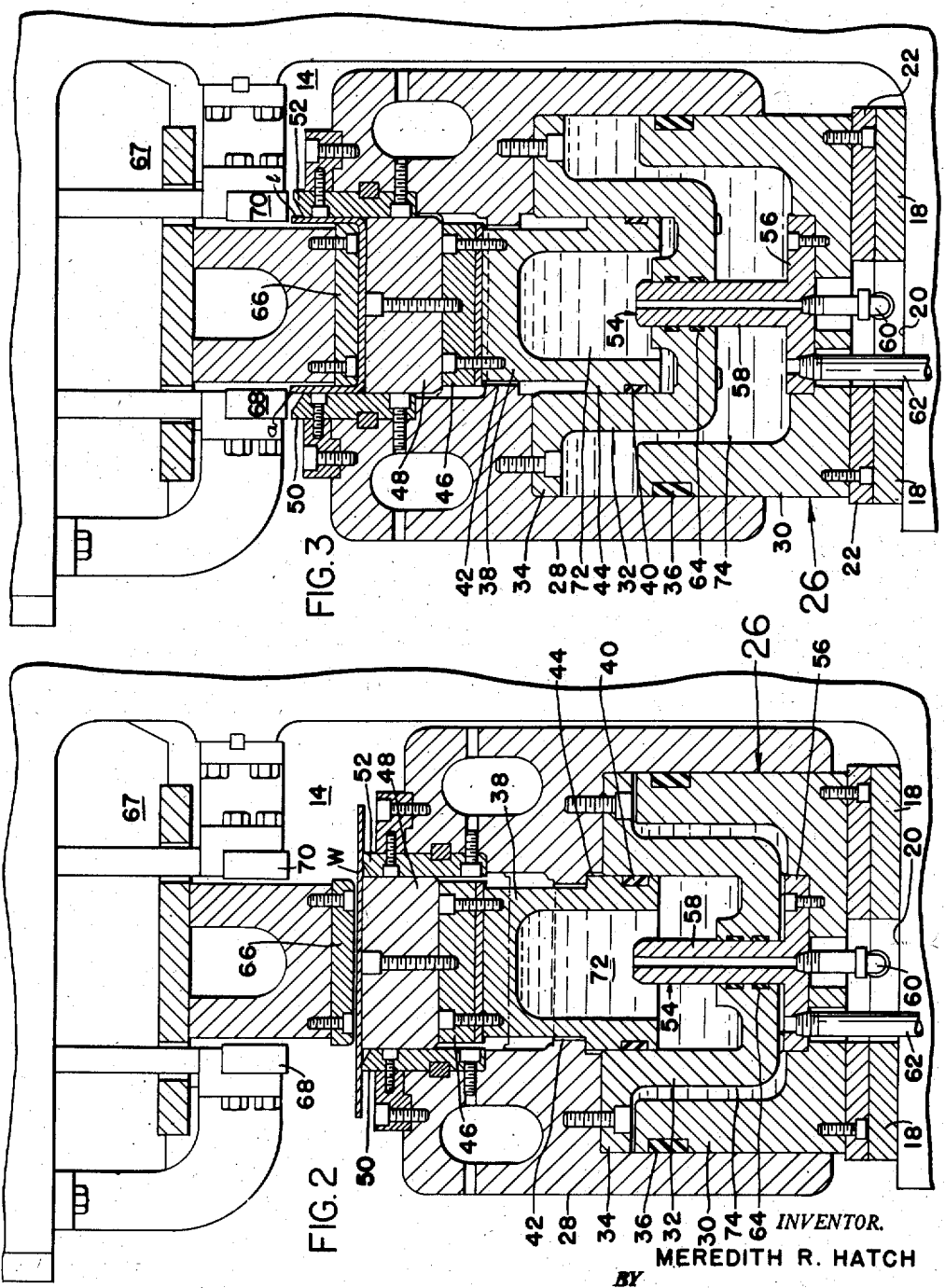

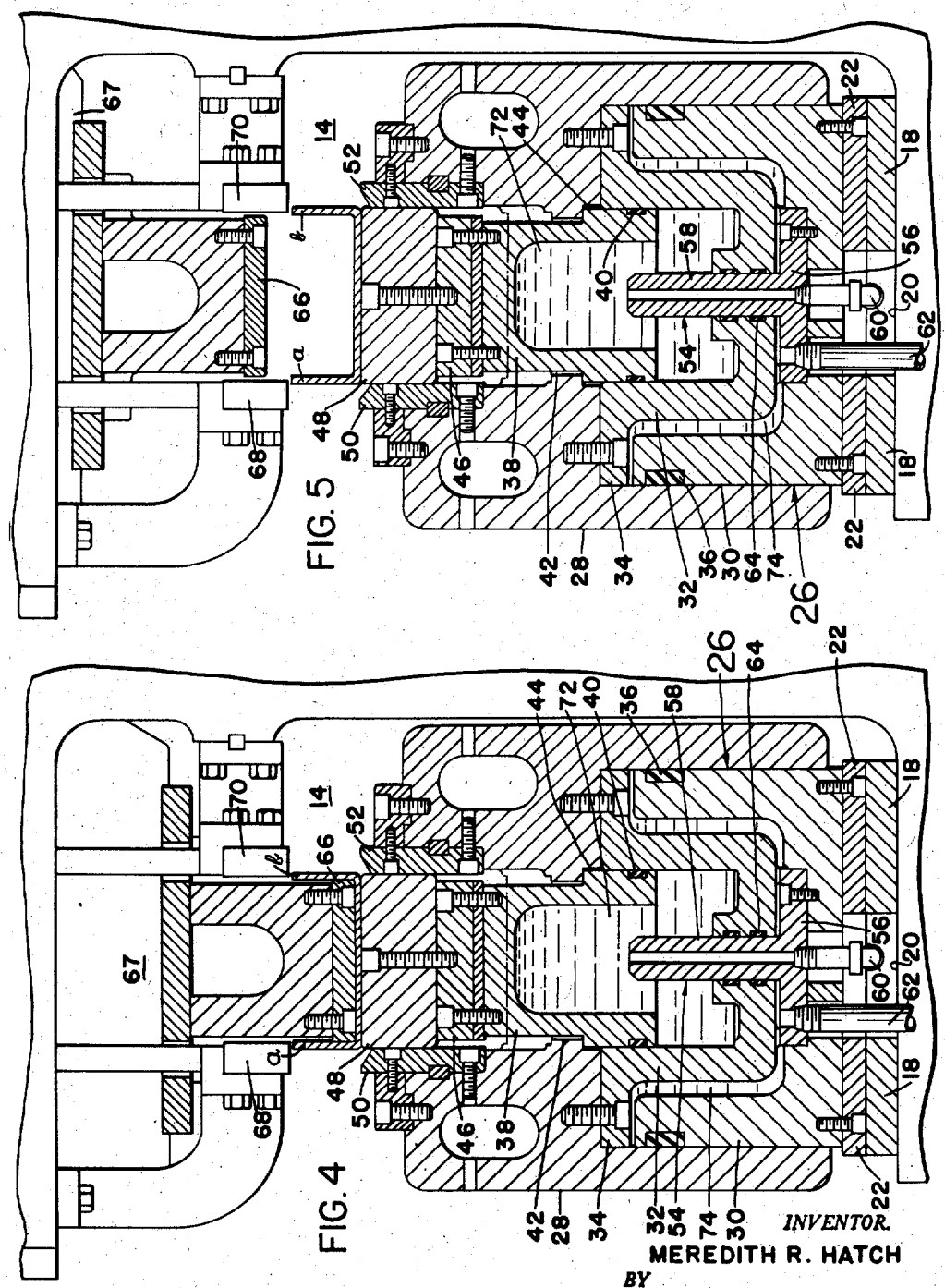

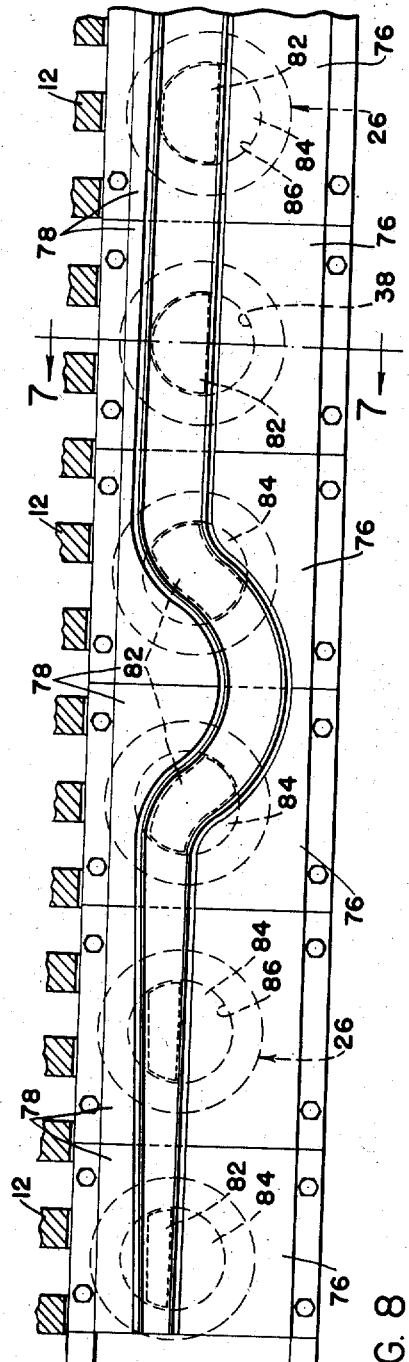
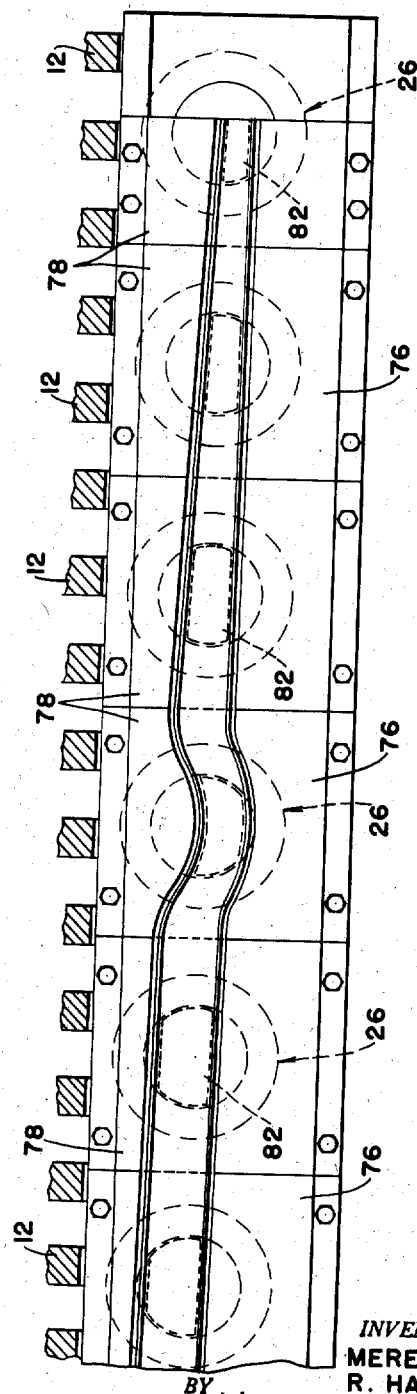
FIG. 8
INVENTOR.
MEREDITH R. HATCH

2,920,675
LAMINATED PRESS DIE CUSHION

Meredith R. Hatch, Toledo, Ohio, assignor to E. W. Bliss Company, Canton, Ohio, a corporation of Delaware Application August 3, 1955, Serial No. 526,132

4 Claims. (Cl. 153—25)

This invention relates to the art of metal forming and especially to metal forming in power presses. More particularly the invention relates to the solution of problems involved in forming exceedingly long objects such as channel members employed in the frame work of truck bodies and the like.

Specifically, the invention relates to novel die cushion means acting cooperatively with a power press to form extra long channel members and other similar articles of manufacture. The structure and operation of the die cushion will be set forth with particularity hereinafter, and the press preferred for use with the die cushion means is fully described in the co-pending application of the present applicant entitled "Laminated Press," Serial No. 525,526, and filed August 1, 1955, now Patent No. 2,860,571.

It is among the general objects of the invention to provide novel die cushion forming means adapted to produce elongated structural members and like articles of manufacture.

Other objects of the invention include the provision of novel die cushion means adapted and synchronized to operate with a power press to form extra long channel members; the provision of die cushion means comprising a novel arrangement of hydraulic cylinders and pistons adapted to function in predetermined and useful sequence; in a press, the provision of die cushion means adapted to carry a lower clamping die thereon, a die carried by the press upper slide, and novel means to synchronize the movement of the dies to clamp metal sheet therebetween while forming dies carried on the die cushion housing are actuated to form an article of manufacture from the metal sheet; and the provision of novel means to connect a plurality of die cushion means, as required, in conjunction with preferred press means to form structural channel members of extra length.

The features of this invention which are believed to be novel are set forth with particularity in the appended claims. The invention itself, both as to its organization and use, together with the foregoing and further objects and advantages thereof, may best be understood by reference to the following description taken in connection with the accompanying drawings in which:

Figures 2–5 are fragmentary side elevational views of the press shown in Figure 1, including sectional views of the die cushion to illustrate the relative positions of its members at different times during a cycle of operation.

Reference is now made to the drawings in greater detail, and in particular to Figures 1 through 5, wherein are shown sectional elevations of one of the die cushions of a preferred embodiment of the invention.

Figure 1:
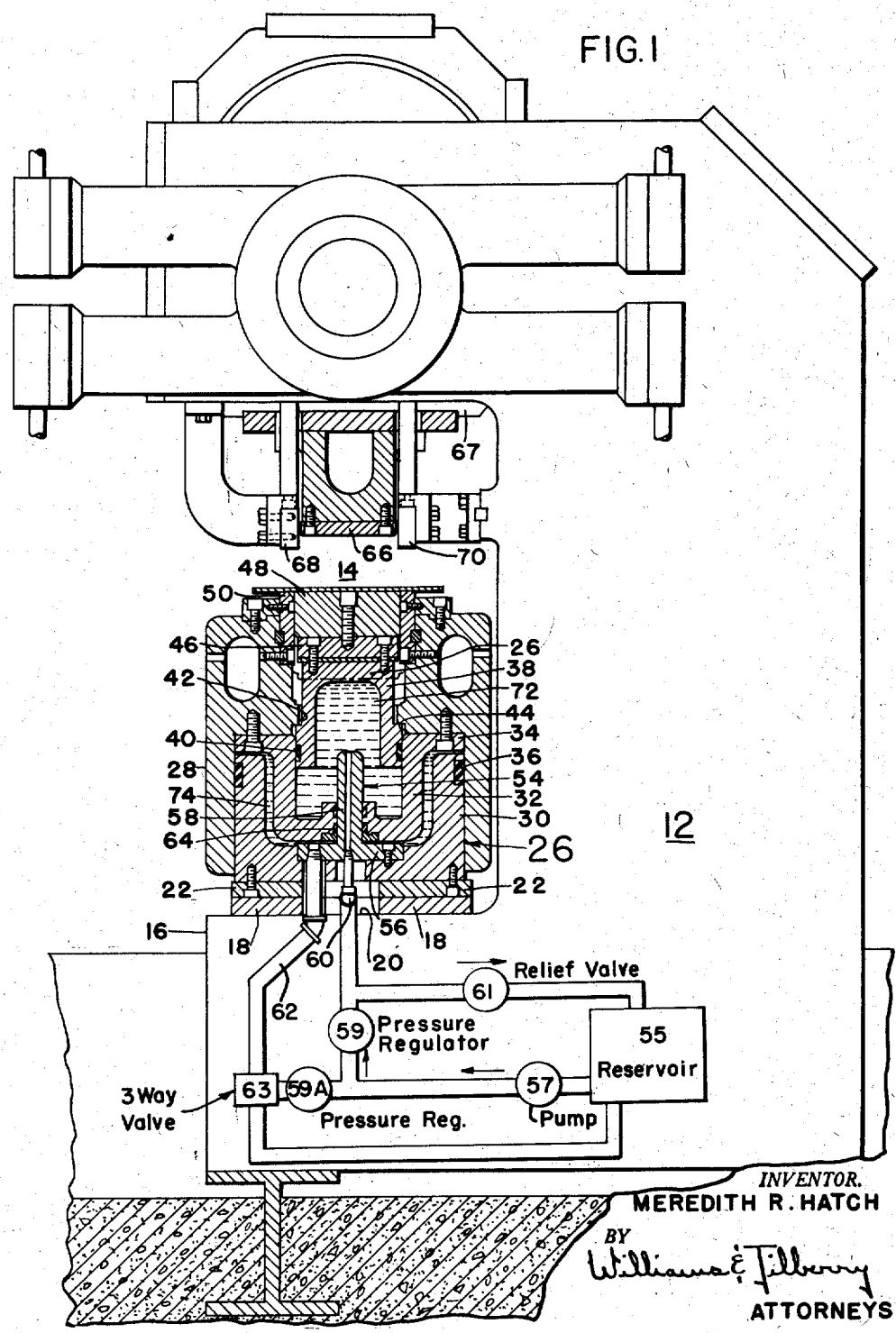
Figure 1 is a side elevational view of a preferred embodiment of the press used in conjunction with novel die cushion means, the die cushion in the figure being shown in full section to illustrate the relationship of its various members when the die cushion is in a retracted or collapsed condition.
Figure 6:
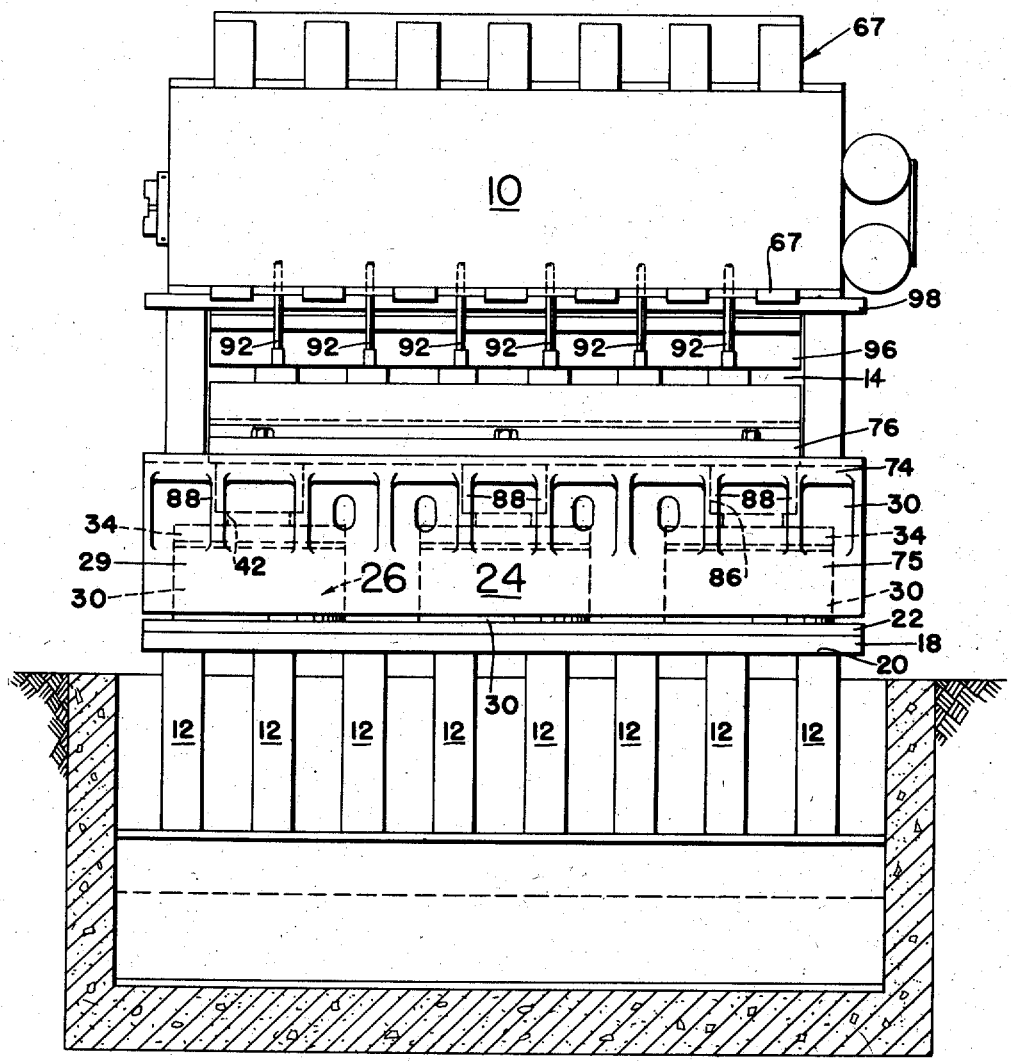
Figure 6 is a front elevational view of a press similar to the press shown in Figure 1, including a front elevational view of a modified embodiment of the die cushion means.

The press 10 comprises a series of one-piece frame members 12 cut from steel slabs, positioned vertically and aligned side by side in as great a number as required in order to provide a die space 14 of predetermined length (see Figures 1 and 6). The die space is provided by the removal of a rectangular piece of stock from the edge 16 of each slab frame member 12. Plates 18 are secured to the press die bed 20 comprising the top edges of the lower portions of each frame member, to assist in tying the frames together and to provide bearing surfaces for bolster plates 22. As aforesaid, the description of this press is set forth more fully in a co-pending application identified hereinabove, and although this press is preferred for use with the invention, it is not intended that the invention be so limited, inasmuch as it is contemplated that other presses may also be suitably employed with the invention.

In order to form a channel, structural member, or the like, forty feet or more in length, for example, sufficient press frame members 12 are suitably fastened together to provide a die space 14 of sufficient length. Thereafter, enough die cushion units 24 (see Figure 6) are secured to the press bolster 22 to provide the necessary forming action on a workpiece placed thereon. A single die cushion unit is shown in Figure 6, whereas the structural member shown in Figure 8 requires four such die cushion units. Each die cushion unit 24 comprises a plurality of die cushions 26 encased in a common housing 28 (Figure 1) or a modified housing 29 (Figure 7) and, for convenience in manufacture and handling, each unit, as shown, comprises a housing and three die cushions therein. The die cushion units are placed in tandem along the length of the die bed 20 in sufficient number to provide forming action throughout the length of a workpiece.

Each die cushion 26 within a die cushion unit comprises a cup-shaped piston 30 (for example see Figure 2) secured on the bottom surface to the bolster plates 22. A cup-shaped inner cylinder 32 is adapted to nest within the piston 30 with its vertical wall spaced horizontally apart from the vertical wall of the piston. The upper rim of the inner cylinder is provided with a horizontally extending annular flange 34 which serves to act as a bearing or supporting surface for a housing 28 which is provided with depending wall portions adapted to slidingly engage the outer walls of the plurality of pistons 30. In the present instance, the housing 28 is adapted to embrace three pistons 30, but it is to be understood that a greater or lesser number of pistons may also be provided with each housing. A seal 36 is recessed in the vertical outer wall of each piston 30 to make the contact between the housing and the piston liquid tight.

An upper piston 38, inverted with respect to the inner cylinder 32 is adapted to have its vertical side wall telescopically engaged within the inner wall of the inner cylinder 32, and a seal 40 is recessed within the vertical outside wall of the upper piston to make a liquid-tight connection between the inner cylinder and upper pistons respectively. A retaining ring 42 integral with the housing 28 is adapted to overlap an annular flange 44 provided on the outside wall of the upper piston 38, the purpose for which will be set forth in due course hereinafter. A stool 46 is bolted or otherwise secured to the top surface of the upper piston to carry a clamping die 48 thereon, and the clamping die is bolted to the top surface of the stool and is shaped to conform with the undersurface of the workpiece throughout its length. A pair of lower dies 50 and 52 are bolted or otherwise secured to the housing 28 by suitable means, and the top edges are flush with the top surface of the clamping die 48 when the die cushion is in the collapsed or lowered position shown in Figure 1.

A hydraulic nozzle fitting 54 is secured to the bottom inside surface of the piston 30, including a horizontally extending flange 56 and a vertically projecting cylindrical portion 58 with an axial bore throughout its length. A second hydraulic fitting 60 is connected to the lower end of the axial bore, and a third hydraulic fitting 62 is secured to a hole provided in the flange of the nozzle. An annular opening is provided in the center of the bottom surface of the lower piston concentric with the nozzle 54, with liquid-tight seals 64 therebetween, enabling the inner cylinder 32 to be centered by and slide on the nozzle 54.

The press is provided with an upper die 66 secured to a press slide 67 and adapted to be moved vertically downward toward the lower clamping die 48, until at bottom dead center it is spaced sufficiently from the lower clamping die to enable a workpiece W to be placed freely therebetween (see Figure 2). With the extra clearance provided, as shown, a wide range of stock gauges can be received between the dies without requiring any adjustment of the press. A pair of strippers 68 and 70 are secured to the press frame on opposite sides of the upper die 66 and spaced above the lower dies a predetermined distance for purposes to be set forth hereinafter. Like the lower clamping die 48 and the lower forming dies 50 and 52, the upper die 66 is continuous throughout the entire length of the die space 14 to provide uniform clamping of the workpiece W.

In operation (see Figure 1), pressure is maintained in chamber 72 by means of fluid pumped from surge tank 55 by pressure pump 57. This pressure is regulated by constant pressure regulator valve 59. Fluid is admitted into chamber 74 also under pressure from pump 57 and is regulated by pressure regulator valve 59–A. The ingress of fluid into chamber 74 causes an egress of fluid from chamber 72 through pressure relief valve 61 for return to surge tank 55. After forming dies 50 and 52 have traveled a sufficient distance to form the workpiece, the ports in three-way valve 63 are changed so that the port from the pump 57 is closed and an exhaust port is opened to provide communication between chamber 74 and surge tank 55. The pressure in chamber 72 then forces the fluid from chamber 74 thereby causing dies 50 and 52 to be stripped from the workpiece. The upper slide 66 is brought downwardly to its bottom dead center position, (Figure 2) and it will be noted that at bottom dead center the upper die does not make contact with the workblank W. The pressure and volume of the fluid between the piston 30 and the inner cylinder 32 is then increased, whereupon the inner cylinder is raised and carries with it on its horizontal flange bearing surface 34 the housing 28. As the housing is elevated, the annular retaining ring 42 moves vertically, permitting the upper piston to follow and thereby clamp the workpiece W between the lower and upper dies 48 and 66 respectively (see Figure 3). Thereafter, further upward movement of the lower clamping die 48 is arrested by the upper die, and the pressure applied through hydraulic fitting 62 continues to force fluid between piston 30 and inner cylinder 32. The pressure between the inner cylinder and upper piston is maintained constant, but because the volume of the chamber 72 is diminishing as the inner cylinder and upper piston telescope together, fluid is forced out of the chamber through the axial bore of the nozzle 54 into suitable surge tank means (not shown). As the pressure between the piston 30 and the inner cylinder 32 continues to elevate the housing 28, the lower dies 50 and 52 are carried upwardly to engage the bottom of the workblank W, thereby folding the opposite sides $a$ and $b$ upwardly about the upper die 66 (see Figure 3). It will be noted that the strippers 68 and 70 on opposite sides of the upper die 66 are spaced to provide clearance for the upwardly folded sides $a$ and $b$ of the workblank.

The pressure between the piston 30 and the inner cylinder 32 is thereafter released and the weight of the housing 28 and related members coupled with constant pressure maintained between the inner cylinder and upper piston, respectively, forces the inner cylinder downwardly to its initial position (see Figure 4).

As the inner cylinder 32 is forced downwardly, the fluid in the chamber 74 between the lower piston 30 and the cylinder 32 is forced outwardly through fluid connection 62 while, at the same time, fluid is admitted through the nozzle 54 into the chamber 72 to maintain the pressure constant in this latter chamber.

With the inner cylinder 32 in its lowermost position, it will be noted that the lower forming dies 50 and 52 have now been stripped from the outside surfaces of sides $a$ and $b$ of the formed workpiece. Thereafter, the upper die 66 is returned to its top dead center position and, as the workpiece tends to cling to the upper die, the upper edges of the sides $a$ and $b$ of the formed workpiece make contact with the lower edges of the stripper members 68 and 70, and the workpiece is thereby stripped from the upper die 66. This completes the work cycle and finds the related members of the die cushion in their initial positions as shown in Figures 1 and 5. The workpiece is then removed from between the dies and a subsequent flat workpiece blank is placed therebetween preparatory to the next forming operation (see Figure 1).

Figure 7:
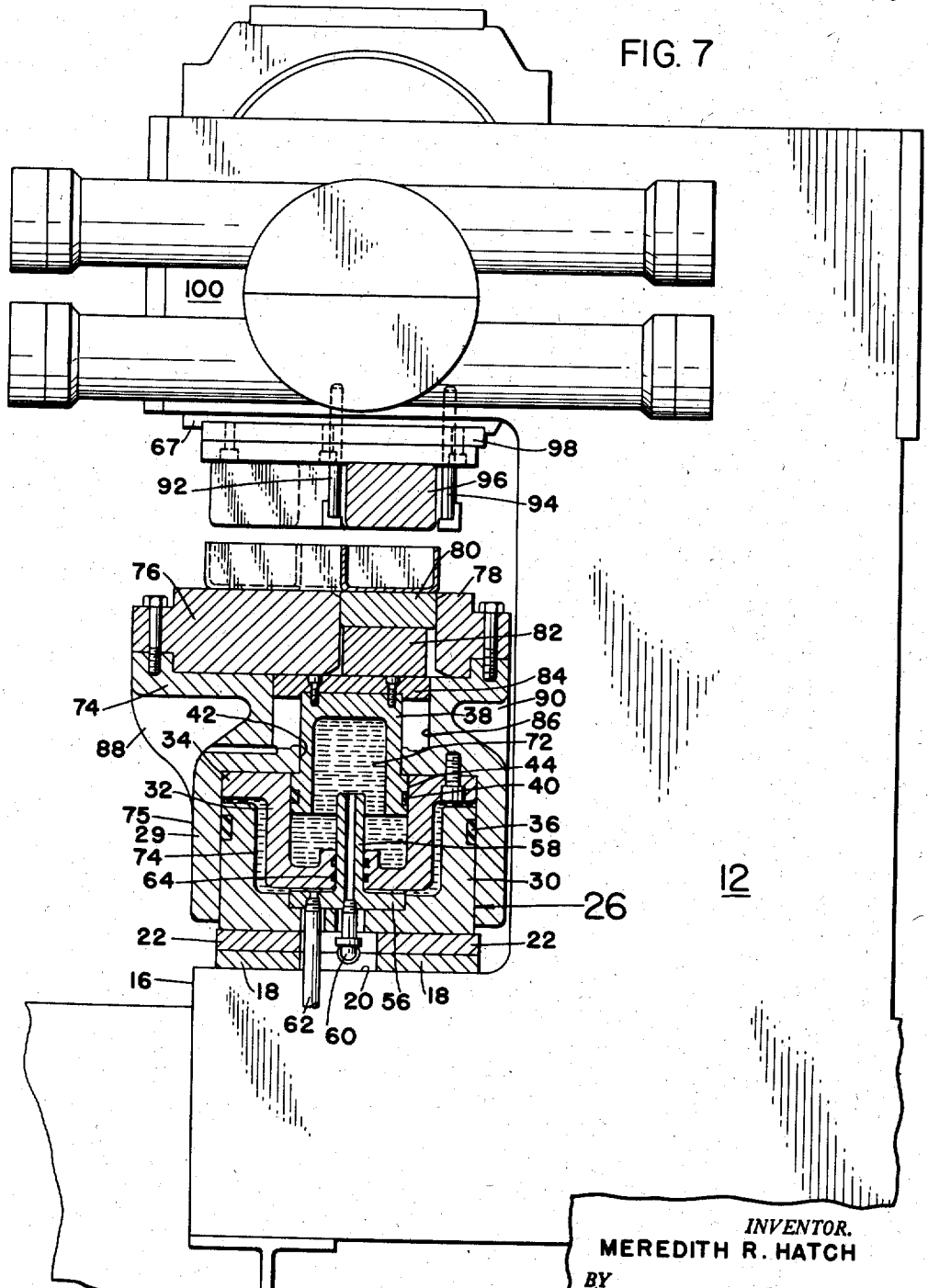
Figure 7 is a side elevational view of the press shown in Figure 6, including a sectional view taken on the line 7—7 of Figure 8, to show a sectional view of a modified die cushion, and, Figure 8 is a plan view of the bed of the press provided with a preferred embodiment of the subject die cushion means.

Certain structural members are necessarily irregular in shape, such as the frame members of truck bodies, as shown in Figure 8, and in order to form irregularly shaped channels of this sort, it is necessary to modify the die cushion housing as well as the lower forming dies, stool, and lower clamping die. As shown in Figure 7, the upper portion of the housing 29 is provided with an enlarged horizontal table 74 which projects forwardly beyond the front vertical wall 75 of the housing. Accordingly, lower forming die 76 is horizontally elongated to compensate for this off-center condition so that forming die 76 and forming die 78 are adjacent the opposite sides of the off-center lower clamping die 80. Because the clamping die 80 is off-center, its supporting stool 82 is correspondingly off-center and must, therefore, be supported by a circular disc or plate 84, which is secured to the top surface of the upper piston 38 to reciprocate within the cylindrical bore 86 provided in the modified housing 29. The overhanging ledge portions of the table 74 are structurally reinforced by webs 88 and 90 on opposite sides of the housing. Strippers 92 and 94, on opposite sides of the upper clamping die 96, pass freely through holes in slide plate 98 for threaded engagement with the overhanging upper portions 100 of the frame members 12. Although shown to be slightly different from strippers 68 and 70 (Figures 1–5) their function and operation is the same.

Aside from the above noted points of difference, the die cushion shown in Figure 7 otherwise remains substantially the same as the first described die cushion, there being no change in the lower piston 30, upper piston 38, nozzle 58, cylinder 32, or hydraulic control means 60 and 62.

It is to be understood that the embodiments of the invention shown herein are by way of example only and are not intended to be construed in a limiting sense. It is believed that the foregoing discussion and illustrations enables those skilled in the art to practice the invention; and that other arrangements and modifications will occur to those guided by the teaching of this invention and may be resorted to without departing from the scope of the invention.

I claim:

1. The improvement in die cushion forming means comprising: a plurality of die cushion units adapted to be aligned in tandem from side to side of a press and secured to the die bed thereof; each of said units including a plurality of die cushions adapted to be simultaneously operable by a common source of hydraulic pressure; a housing common to said plurality of die cushions and having depending side walls adapted to telescopically engage each of said die cushions; common work clamping die means secured to the top surfaces of said die cushion units positioned for cooperative inter-action with press upper slide die means, and workpiece flanging die means secured to the top surface of said common housing, whereby hydraulic actuation of said die cushions synchronously moves said common housing and said die cushions vertically to form a workpiece held between the aforesaid press upper slide die means and said common work clamping die means.

2. In a power press having a frame, an upper slide, upper die means secured to said upper slide, and a die bed, the improvement in die cushion channel forming means comprising: a plurality of die cushions secured to said die bed, each having a cup-shaped lower piston; an inner cylinder adapted to nest within said piston to define a first chamber therebetween; a concave inverted upper piston adapted to be received within the said inner cylinder to define a second chamber therebetween; common clamping die means secured to the top ends of said upper pistons; a common lower piston cylinder housing adapted to encase said plurality of lower pistons, including side portions adapted to telescope downwardly about the outside portions of said lower pistons; means to secure said plurality of inner cylinders to said cylinder housing; flanging die means secured to the top side of said common cylinder housing; means to lower said upper die means toward said clamping die means until only spaced therefrom sufficiently to receive a workpiece blank freely therebetween; means to admit fluid under pressure into said first chamber; means to admit fluid under pressure into said second chamber; means to maintain constant pressure in said second chamber as the volume of said chamber varies; and means to control ingress and egress of fluid from said first and second chambers whereby an ingress of fluid pressure in said second chamber expands said chamber to raise said upper piston and the clamping die means secured thereto to clamp the workpiece blank against said upper die means, and an ingress of fluid pressure in said first chamber raises said common housing and the flanging dies secured thereto to flange said workpiece blank.

3. The device set forth in claim 2, wherein said lower die means comprises a pair of dies adjacent opposite sides of said clamping die, and secured to the upper surface of said common housing for concurrent movement with said housing, whereby elevation of said pair of dies by said common housing folds a pre-positioned workpiece blank upwardly about said upper die to form a U-shaped channel workpiece.

4. A channel forming press comprising a plurality of flat slab-like upstanding frame members aligned side by side and horizontally spaced apart; a plurality of flat slab-like slide members aligned side by side and spaced apart each slide member being adapted to slide between a pair of adjacent frame members; upper die means secured common to the lower edges of said slide members and extending from side to side of the press; a die bed formed in said frame members; and die cushion means supported by said die bed and extending from side to side of the press, including a plurality of die cushions horizontally spaced apart and secured to said die bed; each of said die cushions comprising a lower piston secured to said die bed; an inner cylinder fitted within said lower piston; an upper piston fitted within said inner clinder; clamping die means secured to the top side of said upper piston, said clamping die means extending from side to side of said press and being commonly secured to all of said die cushions; a housing extending from side to side of said press and having depending side walls adapted to telescopically engage each of said lower pistons; lower die means secured to said housing on opposite sides of said clamping die means; means to admit fluid under pressure between said inner cylinder and upper piston; means to admit fluid under pressure between said cylinder and said lower piston; means to permit ingress and egress of fluid between said inner cylinder and upper piston while maintaining the pressure constant therebetween; and means to vary the volume of fluid between said cylinder and said lower piston, whereby an increase of pressure and volume of fluid between said cylinder and said lower piston causes an egress of fluid from between said inner cylinder and upper piston to vertically elevate said lower die means.

References Cited in the file of this patent

UNITED STATES PATENTS

| | | |
|---|---|---|
| 298,224 | Morgan | May 6, 1884 |
| 1,002,747 | Parish | Sept. 5, 1911 |
| 1,152,984 | Sherbondy | Sept. 7, 1915 |
| 1,373,572 | Smith et al. | Apr. 5, 1921 |
| 1,475,355 | Smith | Nov. 27, 1923 |
| 2,403,339 | Byerlein | July 2, 1946 |
| 2,416,058 | Mangnall | Feb. 18, 1947 |

FOREIGN PATENTS

| | | |
|---|---|---|
| 15,222 | Great Britain | Aug. 11, 1904 |
| 154,256 | Germany | Sept. 20, 1904 |